United States Patent [19]

Farrell

[11] 3,938,546
[45] Feb. 17, 1976

[54] FAUCET WITH VALVE CARTRIDGE

[75] Inventor: Gerald J. Farrell, Elmhurst, Ill.

[73] Assignee: Elkay Manufacturing Company, Broadview, Ill.

[22] Filed: Oct. 15, 1974

[21] Appl. No.: 514,607

Related U.S. Application Data

[62] Division of Ser. No. 313,824, Dec. 11, 1972, Pat. No. 3,854,493.

[52] U.S. Cl. .............................. 137/454.2; 137/359
[51] Int. Cl.² ......................................... F16K 51/00
[58] Field of Search ................. 137/454.2, .4, .5, .6, 137/625.7, 636.2, .3, 359

[56] References Cited
UNITED STATES PATENTS

| | | | |
|---|---|---|---|
| 3,035,612 | 5/1962 | Lyon | 137/625.17 |
| 3,324,884 | 6/1967 | Dornaus | 137/625.17 |
| 3,433,264 | 3/1969 | Parkison | 137/625.17 |
| 3,472,279 | 10/1969 | Sanderson | 137/119 X |
| 3,533,436 | 10/1970 | Parkison | 137/625.4 X |
| 3,623,510 | 11/1971 | Hare | 137/636.3 |
| 3,667,503 | 6/1972 | Farrell et al. | 137/625.4 |
| 3,678,961 | 7/1972 | Grosche | 137/636.2 |
| 3,736,959 | 6/1973 | Parkison | 137/625.17 |

*Primary Examiner*—Henry T. Klinksiek
*Attorney, Agent, or Firm*—Prangley, Dithmar, Vogel, Sandler & Stotland

[57] ABSTRACT

A faucet includes a valve cartridge having a housing with an inlet and outlet thereto. A valve plate is movable in the housing with respect to a fixed valve seat to control the quantity of fluid delivered from the inlet to the outlet. A bearing plate is positioned against the valve plate, a handle being provided on a handle bearing support to control the valve plate. A gasket between the valve seat and the housing is preloaded to provide a fluid-tight seal between the valve plate and the valve seat and a predetermined amount of friction therebetween. In manufacturing such a valve cartridge wherein the housing and the handle bearing support are formed of plastic, the parts are assembled and an ultrasonic welding mechanism is operated fixedly to secure the handle bearing support to the housing.

It is preferable that the valve cartridge have a cylindrical housing in which the valve means are located and a base which carries the housing having its periphery confined within the periphery of the housing, and being recessed to define flange means for accepting fasteners used in mounting the valve cartridge.

Where the valve cartridge is to be used to control the quantity and ratio of two liquids, two inlets to the housing would be provided. A fluid control member is usable in one orientation to admit one liquid to one inlet and the other liquid to the second inlet. By changing the orientation of such fluid control member, the liquid from the first duct is delivered to the second inlet, and the liquid from the second duct is delivered to the first inlet.

5 Claims, 11 Drawing Figures

FAUCET WITH VALVE CARTRIDGE

This is a division, of application, serial No. 313,824, filed December 11, 1972, now U.S. Pat. No. 3,854,493.

BACKGROUND OF THE INVENTION

The desirability of using valve cartridges has been recognized. An example is the cartridge disclosed in U.S. Pat. No. 3,533,436. However, the cartridge disclosed in that patent has external gaskets which are deformed to provide a seal for the cartridge while it is being mounted. Also, the diameter of the cartridge must be sufficient to accommodate the passage of screws extending longitudinally therethrough and into the faucet. The screws, when tightened, cause the gaskets to deform and thus provide the necessary seal. The valve seat and valve plate have diameters somewhat less than the over-all diameter of the cartridge, so that there is sufficient room for the screws to pass through the cartridge near the periphery thereof, but not through the valve seat and valve plate. Moreover, the patented cartridge does not have integral therewith a diverter which would enable the cartridge to be used in single-spray attachment applications or tub-shower applications.

SUMMARY OF THE INVENTION

This invention relates generally to a valve cartridge usable in faucets or the like, to a method for making such valve cartridge, and to a fluid control member to select which fluids are to be delivered to which of the valve cartridge inlets.

It is an important object of the present invention to provide a replaceable valve cartridge which can be installed without any adjustment so as not to require a plumber's assistance.

Another object is to provide a valve cartridge which has fluid-tight and long-lasting seals therein.

Still another object is to provide a valve cartridge which is inexpensively constructed, so that it can be discarded when the elements thereof have become worn.

Yet another object is to provide a valve cartridge in which the housing and the base portion thereof are constructed of plastic.

A further object is to provide a valve cartridge which includes a housing in which is disposed a fixed valve seat, a movable valve plate, and a bearing member secured to the housing, the seal between the valve plate and the valve seat being fluid-tight and having a predetermined amount of friction therebetween by virtue of the cartridge having been preloaded.

A still further object is to provide a valve cartridge which can be assembled in a faucet or the like simply and rapidly.

A yet further object is to provide a replaceable valve cartridge which consumes a minimum space in the faucet in which it is mounted.

Yet another object is to provide a valve cartridge having a plastic housing containing a fixed valve seat, a movable valve plate, and a plastic bearing secured to the housing by ultrasonic welding.

Another object is to provide a valve cartridge having molded as a part thereof a diverter duct which may or may not be used, as desired, without modification of the cartridge.

Another object is to provide an improved method for making a valve cartridge.

Still another object is to provide a method for making a valve cartridge in which the gaskets thereof are preloaded with a predetermined force to insure seats that are fluid-tight and have a predetermined amount of friction therebetween.

In summary, there is provided a valve cartridge comprising a housing having a support surface, the support surface having inlet and outlet ports extending therethrough, gasket means on the support surface, a valve seat on the gasket means and having a sealing surface and at least two holes respectively in registration with the ports, a valve plate having a sealing surface and a bearing surface and fluid control means in the sealing surface, the sealing surfaces being in slidable engagement with each other, and bearing means having a bearing surface in sliding engagement with the bearing surface of the valve plate, the valve plate being slidable between the valve seat and the bearing means to vary the position of the fluid control means to control the quantity of fluid delivered from the inlet port to the outlet port, the bearing means being factory-affixed to the housing to preload said gasket means with a predetermined force to provide a fluid-tight seal between the sealing surfaces and a predetermined amount of friction therebetween.

In a more specific form, the bearing means includes a bearing plate and a handle support which carries a handle operatively connected to the valve plate for effecting sliding movement thereof. Also, the valve cartridge may have a solid base portion in the housing with the upper surface thereof defining the aforementioned support surface.

Another form of the invention includes a method of making the valve cartridge comprising the steps of providing a housing which includes a support surface having two recesses therein and inlet and outlet ports therethrough respectively communicating with the recesses, placing two gaskets respectively in the recesses so as to protrude beyond the support surface, providing a valve seat having a sealing surface and at least two holes, placing the valve seat in the housing and on the gaskets, providing a valve plate having a sealing surface and a bearing surface and fluid control means in the sealing surface, placing the valve plate in the housing so that its sealing surface rests on the sealing surface of the valve seat, placing the bearing means in the housing so that its bearing surface rests on the bearing surface of the valve plate, applying pressure to the bearing means to compress the gaskets and thereby provide a fluid-tight seal between the sealing surfaces and a predetermined amount of friction therebetween, and affixing the bearing means to the housing.

In a specific form of the method, ultrasonic energy is applied to embed the bearing means in the housing.

In another form, the valve cartridge comprises a generally cylindrical housing having a chamber therein, inlet and outlet ports in the housing for the chamber, valve means in the chamber for controlling the quantity of fluid delivered from the inlet port to the outlet port, control means extending from one end of the housing for controlling the valve means, and a base integral with the housing and extending from the other end thereof and having the periphery thereof confined within the periphery of the cylindrical housing, a recess in the base defining flange means on the portion of the base disposed away from the housing, the flange means having at least one opening extending therethrough for receiving a fastener to mount the cartridge.

The invention, both as to its organization and method of operation, together with further objects and advantages thereof, will best be understood by reference to the following specification taken in connection with the accompanying drawings, in which:

Figure 1:
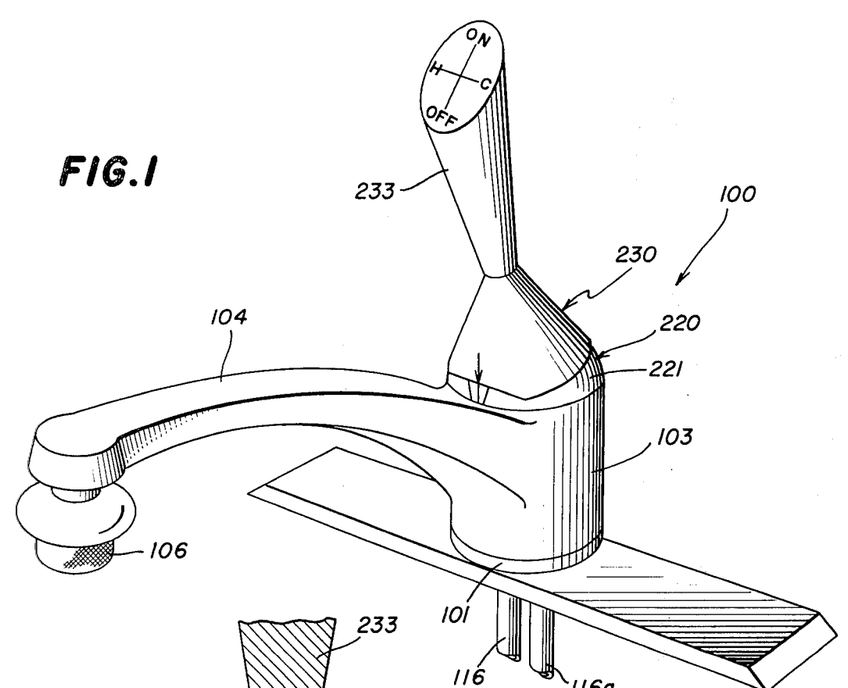
FIG. 1 is a perspective view of a faucet in which is mounted a valve cartridge incorporating therein the features of the present invention.
Figure 2:
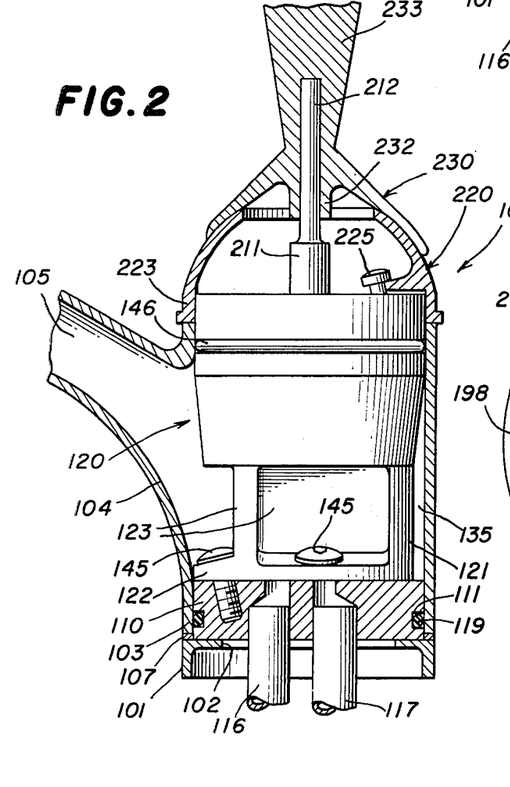
FIG. 2 is a view in vertical section through the faucet of FIG. 1 on an enlarged scale, but with only the exterior of the valve cartridge being visible.
Figure 3:
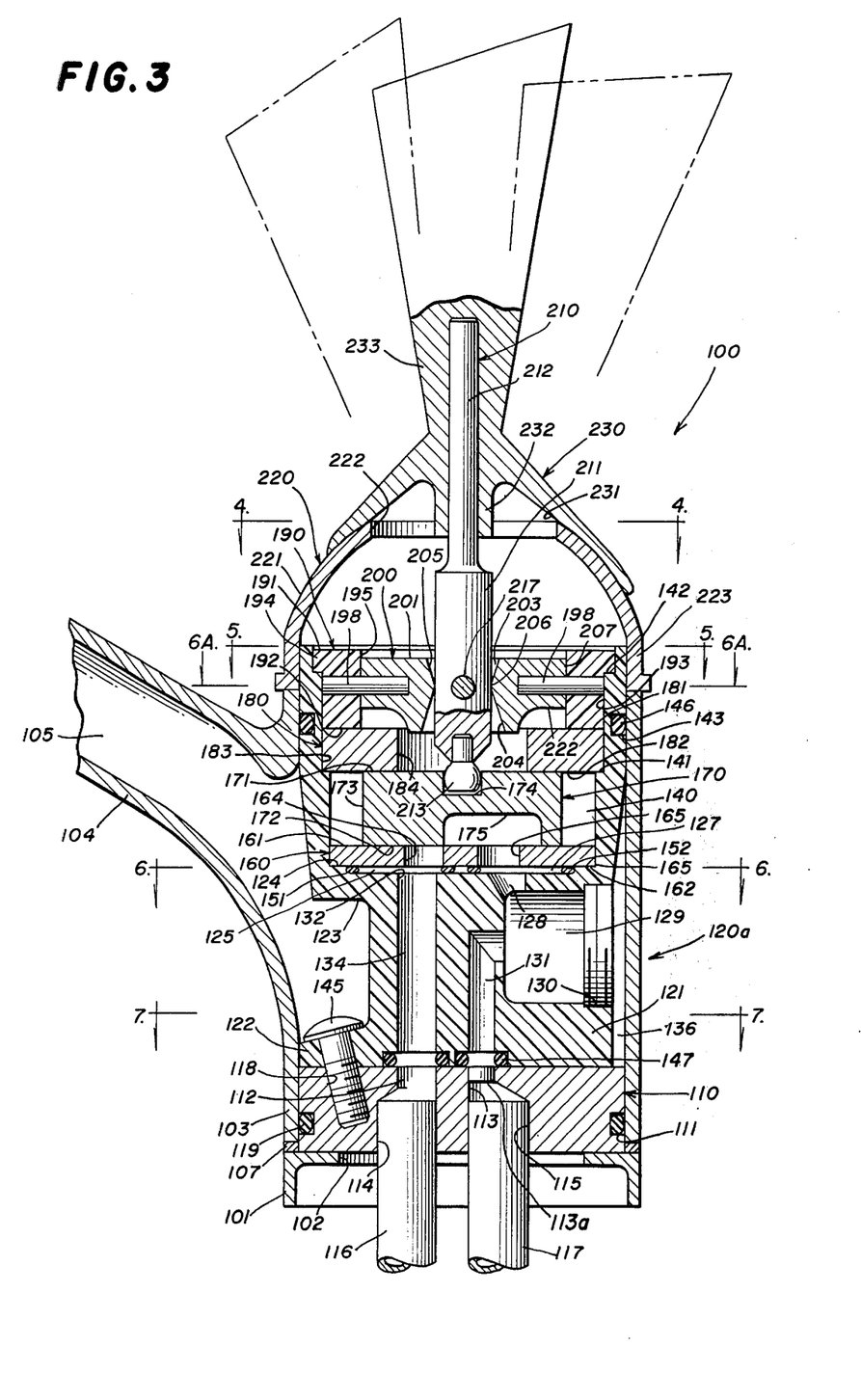
FIG. 3 is a view like FIG. 2, but on an enlarged scale and with the valve cartridge also in vertical cross section to expose the elements thereof.
Figure 4:
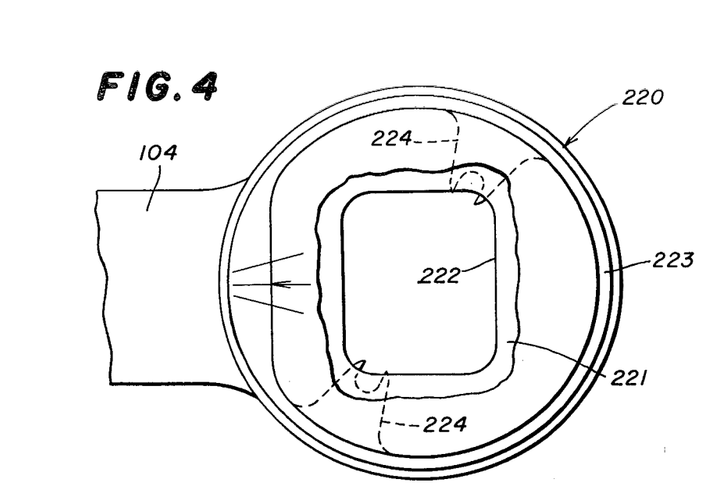
FIG. 4 is a view in horizontal cross section taken along the line 4—4 of FIG. 3.
Figure 5:
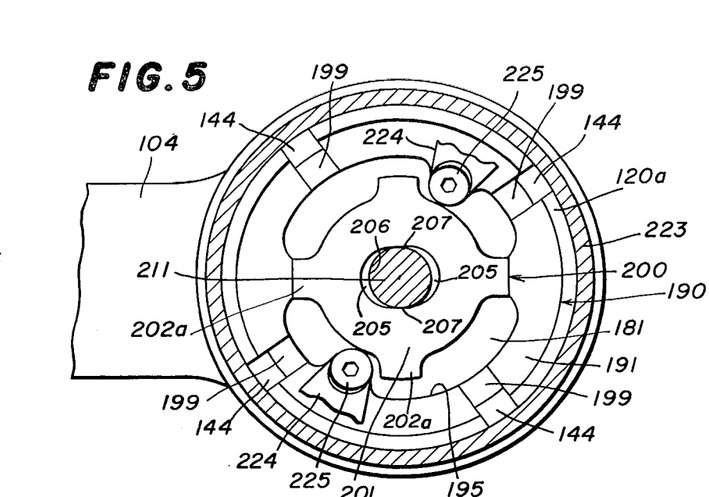
FIG. 5 is a view in horizontal cross section taken along the line 5—5 of FIG. 3.
Figure 6:
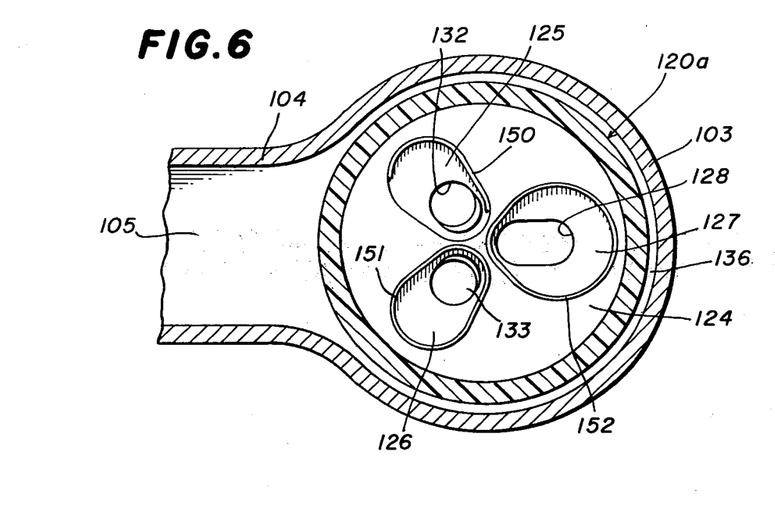
FIG. 6 is a view in horizontal cross section taken along the line 6—6 of FIG. 3.
Figure 6A:
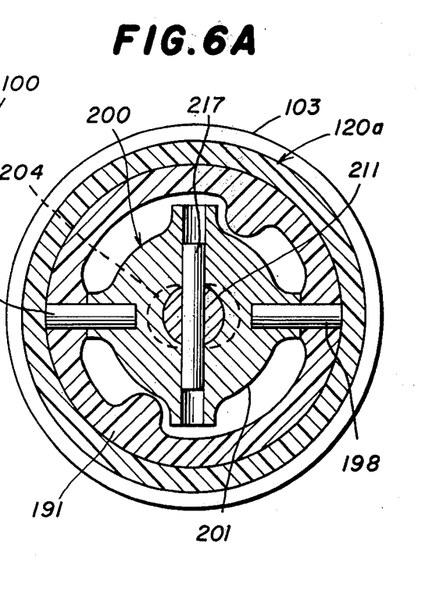
FIG. 6A is a view in horizontal cross section taken along the line 6A—6A of FIG. 3.
Figure 7:
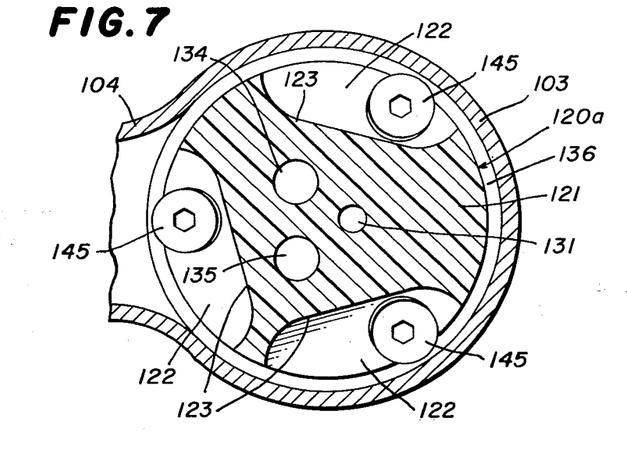
FIG. 7 is a view in horizontal cross section taken along the line 7—7 of FIG. 3.

Referring now to FIGS. 1 to 7 of the drawings, there is shown a faucet, generally designated by the number 100, including a pedestal 101 for mounting on a sink or other suitable location. As can be seen in FIGS. 2 and 3, an opening 102 is formed in the pedestal 101 for accommodating water inlets as will be described hereinafter. A casing 103 which is generally cylindrical in shape and circular in cross section has a spout 104 protruding therefrom and being integral therewith. The spout 104 is hollow and defines a passageway 105 for the flow of liquids to an aerator 106 mounted on the end of the spout 104. The casing 103 is mounted on the pedestal 101 there being provided a plastic wear ring 107 between the casing 103 and the pedestal 101.

Disposed within the casing 103 and mounted upon the pedestal 101 and overlying the opening 102 is a substantially solid base 110 which is generally cylindrical in shape and circular in cross section. A channel 111 is formed in the periphery of the base 110. The base 110 is provided with a set of three ducts 112, 113, and a third duct not shown but located directly behind the duct 112, as viewed in FIG. 3. The duct 112 has an increased diameter portion 114, and the duct 113 has an increased diameter portion 115. Similarly, the third duct not shown also has an increased diameter portion. A fluid inlet conduit 116 is fitted into the duct 112, and a second fluid inlet conduit 116a is fitted into the duct directly behind the duct 112. Preferably, the valve cartridge of this invention is adapted for use with hot and cold water faucets, whereby the fluid inlet conduits 116 and 116a will respectively deliver cold and hot water to the valve cartridge. There is also provided a diverter conduit 117 in the duct 113, which furnishes an outlet for water from the valve cartridge, as will be described hereinafter. When a diverter mechanism is not used, a block 113a may be used as shown. Disposed in the top surface of the base 110 is a set of three threaded bores 118 at 120° intervals and slanted inwardly to facilitate the threading of screws thereinto. An elastomeric O ring 119 is provivded in the channel 111 to provide a water-tight seal between the base 110 and the casing 103.

Mounted on top of the base 110 and within the casing 103 is a valve cartridge designated generally by the numeral 120. The valve cartridge 120 includes a housing 120a which is generally cylindrical in shape and circular in cross section and includes a substantially solid base 121 the bottom of which merges into feet or flanges 122 having the upper surfaces thereof sloped slightly downwardly and outwardly, the flanges being within the confines of the housing 120a. There is provided a hole in each one of the flanges 122 which hole is inclined slightly and is in registration with the associated bore 118 on the base 110. The portion of the housing 120a over each flange 122 is cut out or recessed at 123 to enable the assembler to gain access to attach the valve cartridge 120, as will be described hereinafter. The top of the base portion 121 defines a support surface 124, which has therein three recesses 125, 126 and 127. The recesses 125 and 126 are substantially egg-shaped in outline (see FIG. 6 particularly), and the recess 127 is almost circular in outline. The recesses 125, 126 and 127 are arranged in a generally-triangular pattern about the vertical axis of the housing 120a, with the recesses 125 and 126 being disposed toward the spout side of the housing 120a and with the recess 127 being disposed away from the spout side of the housing 120a. Formed in the recess 127 is a fluid outlet port 128 communicating with a cylindrical bore which defines a main outlet 129 and has its longitudinal axis disposed generally normal to the axis of the housing 120a. The outer end of the main outlet 129 defines a mouth 130 which is threaded to receive a suitably-formed nut. Communicating with the main outlet 129 is an L-shaped diverter duct 131, the axis of the shorter leg being aligned with the axis of the main outlet 129 and the axis of the longer leg disposed parallel to the axis of the housing 120a. Also formed in the support surface 124 is a pair of inlet ports 132 and 133 through which will pass respectively the cold and hot water if the valve cartridge 120 is used in a hot and cold water faucet. The inlet port 132 communicates with the cold water duct 134, and the inlet port 133 communicates with the hot water duct 135 (see FIG. 7).

The portion of the housing 120a above the support surface 124 is hollow and defines a chamber 140. The inside surface of the housing 120a is offset outwardly about one half way up to define a shoulder 141. Near the outer end of the housing 120a is a further offset in the inside surface of the housing 120a to define a second shoulder 142. A channel 143 is formed in the outer surface of the housing 120a near the outer end thereof. Four slots 144 (FIG. 5) are formed at 90° intervals in the upper edge of the housing 120a to a depth approximately equal to the width of each slot. The slots 144 are used in assembling the valve cartridge 120, as will be described hereinafter. Disposed in the recesses 125, 126, and 127 respectively are gaskets 150, 151 and 152, each conforming to the shape of the associated recess. Prior to assembly the gaskets protrude above the support surface 124.

Disposed in the chamber 140 and overlying the gaskets 150, 151, and 152 is a valve seat 160 in the form of a disc. The valve seat 160 has a flat planar upper surface 161, a flat planar lower surface 162, and a cylindrical side surface 163 interconnecting the upper and lower surfaces 161 and 162. The side surface 163 has a circumference only slightly less than the circumference of the chamber 140, whereby the valve seat 160 fits snugly within the chamber 140 and against the inner surface of the housing 120a. The side surface 163 of the valve seat 160 has three tabs (not shown) spaced therearound and extending outwardly therefrom and respectively received in suitably-formed grooves (not shown) in the inner surface of the housing 120a for preventing rotational movement of the valve seat 160 within the chamber 140. Formed in the valve seat 160 and extending therethrough is an inlet hole 164, an oulet hole 165, and a further inlet hole which is not shown, the inlet hole 164 being aligned with the duct 134, the inlet hole not shown being aligned with the duct 135, and the outlet hole being aligned with the outlet port 128. The valve seat 160 rests against the support surface 124 of the housing 120a so as to deform the gaskets 150, 151, and 152, thereby providing a fluid-tight seal between the valve seat 160 and the support surface 124.

A cylindrical valve plate 170, is disposed in the chamber 140 and overlies the valve seat 160, the valve plate 170 having a flat planar upper surface which defines a bearing surface 171, a flat planar lower surface which defines a sealing surface 172, and a cylindrical side surface 173 interconnecting the bearing surface 171 and the sealing surface 172 at the peripheries thereof. The valve plate 170 has a diameter substantially less than the diameter of the chamber 140, whereby the valve plate 170 is movable laterally within the chamber 140. In the surface 171 of the valve plate 170 is formed a centrally-disposed, generally-rectangular recess 174 having a depth preferably less than one-half of the thickness of the valve plate 170 for a purpose to be explained below. The sealing surface 172 of the valve plate 170 has formed therein a fluid control means in the form of a recess 175 defining a mixing cavity for the valve structure. In the preferred embodiment, the recess 175 has a vertical depth of approximately one-half the thickness of the valve plate 170 and is generally T-shaped in outline. The recess 175 is so positioned in the valve plate 170 as to be registrable with the upper ends of the inlet and outlet holes in the valve seat 160 for controlling the fluid flow therethrough.

Overlying the valve plate 170 and contacting the bearing surface 171 thereof is a disk-like bearing plate 180 shaped complementary to the wall of the housing 120a and in closely-spaced relationship with the inner surface thereof. The bearing plate 180 has a flat planar upper surface 181 and a flat planar lower surface which defines a bearing surface 182, and a cylindrical side surface 183. Centrally disposed in the bearing plate 180 is an opening 184 extending therethrough, which is substantially circular in cross section and has dimensions substantially greater than the dimensions of the rectangular recess 174 in the upper surface 171 of the valve plate 170. The bearing plate 180 seats firmly on the shoulder 141.

Overlying the bearing plate 180 and contacting the upper surface 181 thereof is an annular bearing support, generally designated by the numeral 190, having an upper surface 191, a lower surface 192 and a cylindrical outer side surface 193. Formed in the upper end of the side surface 193 is an annular, outwardly-protruding lip 194. A centrally-disposed opening extends through the bearing support 190 and defines an inner cylindrical surface 195. The diameter of the side surface 193 is slightly less than the diameter of the inside surface of the housing 120a in the region between the shoulders 141 and 142 so as to fit snugly thereagainst. The diameter of the lip 194 is slightly greater than the diameter of the inside surface of the housing 120a in the region between the shoulder 142 and the outer end of the housing 120a so as to fit snugly thereagainst and to rest on the shoulder 142. A pair of pivot pins 198 is respectively disposed in corresponding openings in the bearing support 190, the longitudinal axes of the pivot pins 198 being horizontally aligned along the diameter of the bearing support 190 and each of the pins 198 extending radially inwardly of the inner surface 195 substantially to the side surface 193. Four slots 199 (FIG. 5) are formed at 90° intervals through the bearing support 190.

Disposed within the bearing support 190 is a handle bearing 200 which is generally cylindrical in shape and has an upper surface 201. Equidistantly spaced about the circumference of the handle bearing 200 and extending radially outwardly therefrom are four extensions 202a. Two of the extensions 202a have openings therein for receiving the inner ends of the pivot pins 198, whereby the bearing member 200 is pivotally mounted on the bearing support 190. Centrally disposed in the handle bearing 200 is an opening 203 having its axis generally parallel to the axis of the housing 120a. The opening 203 is defined by two facing lower walls 204 which are slanted downwardly and outwardly, and two facing upper walls which are directed upwardly and outwardly. The juncture of the lower wall 204 and the upper wall 205 on each side of the opening 203 defines an edge 206. The sides 207 of the opening 203 are disposed generally vertically.

A control lever arm generally designated by the numeral 210, includes a vertically extending lower stem 211 and an integral upper stem 212 which is smaller in diameter than the lower stem 211. A coupling member 213 has a stud 216 projecting therefrom and frictionally engaged in a suitably formed bore in the lower end of the stem 211. The coupling member 213 has a curved side surface and a flat bottom surface. The coupling member 213 fits in the lever recess 174 in the valve plate 170 for transmitting motion of the lever arm 210 to the valve plate 170 for controlling operation thereof, as will be described more fully hereinafter. The lower stem 211 carries a pivot pin 217, the longitudinal axes of the pivot pin 217 being horizontally aligned along the diameter of the lower stem 211 and each extending radially outwardly therefrom. The outer ends of the pivot pin 217 are respectively disposed in bores formed in the handle bearing 200, which pin 217 extends normal to the vertical sides 207. The lever arm 210 is therefore pivotal about an axis defined by the pin 217 so as to be pivotal between limits defined by the slanted walls 204 and 205. As previously described, the handle bearing 200 is pivotal about an axis defined by the pivot pins 198, so that the lever arm 210 being carried by such handle bearing 200 is also pivotal about the axis defined by the pivot pins 198. Thus, the lever arm 210 is pivotal in two directions, one normal to the other, that is, about the axis defined by the pivot pin 217 and about the axis defined by the pivot pins 198.

Disposed on the upper portion of the housing 120a is a cover 220 which has a hemispherical outer surface 221, the upper end of which defines a rectangular opening 222. The cover 220 has a depending skirt 233, the inner surface of which conforms to the outer surface of the housing 120a. A pair of tongues 224 is formed on the inner surface of the cover 220 and projects inwardly. Slots are formed in the inner ends of the tongues 224 for receiving screws 225 therethrough. The screws 225 pass through the tongues 224 downwardly and outwardly and engage in threaded openings in the bearing support 190.

Finally, there is provided a handle 230 having a cover plate 231, the inner surface of the cover plate 231 being shaped complementary to the outer surface 221 of the cover 220 and being adapted for sliding engagement therewith. The handle 230 includes a boss 232 extending downwardly from the cover plate 231 and a hand grip portion 233 extending upwardly. A bore extends through the boss 232, the cover plate 231 and the hand grip portion 233 and frictionally receives the upper stem 212 of the lever arm 210.

The details of assembly of the valve cartridge 120 will be described in detail hereinafter. For the moment it is sufficient to note that pressure is applied to the bearing plate 180 to cause the valve seat 160 to deform the gaskets 151, 152 and 153 to provide fluid-tight seals between the valve seat 160 and the support surface 124. The bearing support 190 is then secured in place. The residual force exerted by the gaskets 151, 152 and 153, plus the pressure of the water in the conduits 116 and 117 causes the sealing surface 161 of the valve seat 160 to engage the sealing surface 172 on the valve plate 170 and provide a fluid-tight seal therebetween. Also, the bearing surface 171 on the valve plate 170 firmly engages the surface 182 on the bearing plate 180 which rests on the shoulder 141.

The amount of preloading on the gaskets 151, 152 and 153 should be such as not to unduly inhibit movement of the valve plate 170 in respect to the valve seat 160. Thus, what is desired is that the seal between the sealing surfaces 161 and 172 be fluid-tight, on the one hand, and have a predetermined amount of friction therebetween, on the other. In such cases, the user will exert a substantially constant force when he actuates the handle 210, whereby the "feel" to the user remains constant. Moreover, the "feel" does not vary substantially over the life of the cartridge.

It is to be understood that the distance between the shoulder 141 and the bottom of the recess 125, together with the thicknesses of the plates 160 and 170 determine the amount of "squeeze" imparted to the gaskets 151, 152, and 153, which, in turn, contribute substantially to the seal between the sealing surfaces 161 and 172 and the amount of friction therebetween. A 15 per cent squeeze in the gaskets 151, 152, and 153 would be typical.

Because the bearing support 190 is factory-affixed to the housing 120a, the optimum pressure between engaged seals can be achieved. Thus, the installer is not given the opportunity to provide a pressure between adjacent seals which either is insufficient to achieve good sealing between engaged sealing surfaces or is so much as adversely to affect the feel of the valve cartridge 120. Since no field adjustments are required, installation of the valve cartridge 120 can be effected without the services of a plumber. In fact, it is contemplated that such a valve cartridge can be installed by the home owner.

In a preferred form of the valve cartridge 120, the valve seat 160, the valve plate 170, and the bearing plate 180 were all formed of alumina. Preferably the housing 120a and the bearing support 190 are formed of plastic, and the lip 194 of the bearing support 190 is ultrasonically welded to the adjacent portion of the housing 120a by embedding the lip 194 into such housing 120a. Since the entire base portion 121 of the housing 120a is formed of plastic as is the rest of the housing 120a, the valve cartridge 120 will be less expensive to manufacture and therefore can be discarded when the seals between the engaged sealing surfaces have worn. The task of merely removing a worn valve cartridge 120 and replacing it with a fresh one will be a great deal less expensive to perform than the procedure used today of replacing the seals and other worn elements.

Another advantage of the construction described is that both the main outlet 129 and the diverter duct 131 may be molded into the solid base portion 121. A standard diverter mechanism (not shown) can be placed in the main outlet 129, in which case the block 113a is removed. The diverter mechanism operates in the usual way to permit the water to flow through the passage 136 and out of the spout 105, when the valve provided with the spray head is not actuated. When the sprayhead valve is actuated, the diverter mechanism will cause the water to flow through the diverter duct 131 to the spray head. If the valve cartridge is to be used in an installation not requiring a spray, the block 113a would be provided and the diverter mechanism not utilized. In such case, water will flow through the passage 136 and out the spout 105. It is to be understood that the block 113a is merely exemplary. Alternatively, for example, in an installation not requiring a spray, the base 110 need not be provided with the duct 113 or the conduit 117 therein.

In assembling the valve cartridge 120 into the faucet 100, such cartridge is mounted on the base 110, such that the duct 134 is aligned with the duct 112, the duct 135 is aligned with the duct in which the conduit 116a is disposed, and the diverter duct 131 is aligned with the duct 113. In this position, the attachment holes in the flanges 122 will be aligned with the bores 118 in the base 110. Screws 145 are inserted and threaded into the respective holes, thereby attaching the housing 120a to the base 110. Because the holes are inclined, the screws 145 are also inclined and the heads are more easily reached by a tool. A set of three gaskets 147 is mounted as shown to provide a fluid-tight seal between the adjacent ducts. A particular advantage in the cutouts 123 is that the over-all diameter of the housing 120a may be less than would be required if the screws which attach the valve cartridge 120 extended through the entire housing 120a. Instead, by providing cutouts 123 and fastening the screws 145 at an incline as indicated, the volume of space devoted to the screws is minimized without sacrificing ease in attachment. Because the screws 145 are inclined, the installer of the valve cartridge 120 may more easily engage a tool with the screws 145. In installing the valve cartridge, the screws 145 are first secured to the base 110 as indicated. The plastic wear ring 107 is then placed in position, followed by slipping onto the outside of the valve cartridge 120 the casing 103. The cover 220 is then positioned, so that the skirt 223 rests on the upper end of the casing 103. The screws 225 are then passed through the tongues 224 and engaged in the bearing support 190, thereby securing the cover 220 in place. Finally, the handle 230 is fitted onto the lever arm 210 by a set screw or the like.

As described above, the valve seat 160 is permanently positioned within the housing 120a, so that the two inlet holes (only 164 is shown) are aligned respectively with the inlet ports 132 and 133; and the outlet hole 165 is aligned with the outlet port 128. Thus, a path is provided for uninterrupted flow of cold and hot water respectively from the inlet conduits 116 and 116a to the surface 172 of the valve plate 170. The valve plate 170 is slidably movable between the valve seat 160 and the bearing plate 180 throughout the adjacent portion of the chamber 140. This movement of the valve plate 170 is accomplished by manual actuation of the handle 230. As described above, the handle 230 may be actuated to pivot the lever arm 210 about two axes perpendicular to each other to control the quantity of fluid from the inlet conduits 116 and 116a delivered to the outlet port 128. Moving the handle 230 among the positions indicated by the phantom lines in FIG. 3 varies the volume of water delivered to the outlet port 128. Pivoting the handle 230 about the pin 217 and farthest to the left (as viewed in FIG. 3) as limited by the right-hand surface 204 and the lefthand surface 205, to the "full-off" position, moves the valve plate 170 farthest to the right, so that no portion of the recess 175 is aligned with the inlet holes in the valve seat 160 and thus no water is delivered to the outlet port 128. On the other hand, pivoting of the handle 230 farthest to the right, as limited by the left-hand surface 204 and the right-hand surface 205, to the "full-on" position, causes the entire area of the inlet holes in the valve seat 160 to be aligned with the recess 175, whereupon maximum volume of fluid is delivered from the valve seat 160 through the recess 175 to the outlet port 128.

Pivoting the handle 230 farthest to the right, as viewed in FIG. 1 to the "cold" position, thereby pivoting it clockwise about the pivot pins 198, causes the recess 175 to be in full alignment with one inlet hole 164 and fully out of alignment with the other inlet hole in the valve slot 160. Accordingly, only the cold water in the conduit 116 flows into the recess 175, while none of the hot water in the conduit 116a flows into such recess. In such case the water in the outlet port 128 is cold. Pivoting the handle 230 farthest to the left, as viewed in FIG. 1, to the "hot" position, thereby pivoting it counterclockwise about the pivot pins 198, causes the recess 175 to be fully out of alignment with the one inlet hole 164 and in full alignment with the other inlet hole in the valve seat 160. Accordingly, only the hot water in the conduit 116a flows into the recess 175, while none of the cold water in the conduit 116 flows into such recess. In such case, the water in the outlet port 128 will be hot. Any intermediate position between the afore-mentioned full-on, full-off, cold or hot positions may be achieved to provide any temperature and volume of water at the outlet port 128. Further details as to the precise manner in which the recess 175 operates to control the ratio and quantity of water delivered to the outlet may be had by reference to U.S. Pat. No. 3,667,503 assigned to the assignee of the instant application.

Figures 8, 9, 10:
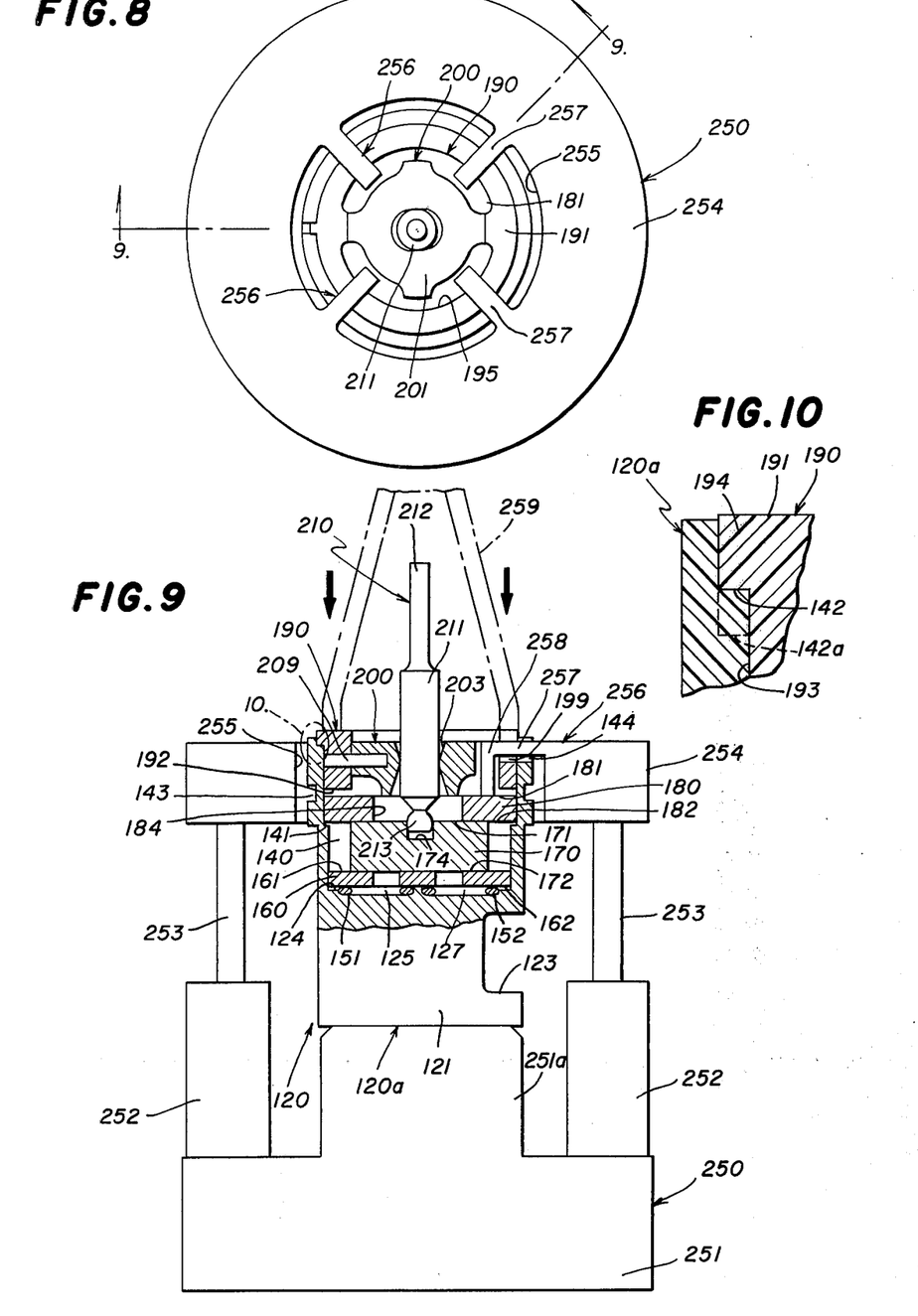
FIG. 8 is a top plan view of a fixture used in assembling the valve cartridge.
FIG. 9 is a schematic view taken along the line 9—9 of FIG. 8, with a portion of the valve cartridge having been broken away to expose the interior thereof and with an ultrasonic welding horn being shown in phantom.
FIG. 10 is a greatly enlarged view of the area within the circle designated 10 in FIG. 9.

Turning now to FIGS. 8 and 9, the details of the method by which the valve cartridge 120 is made will be described. For that purpose, there is provided a fixture 250 having a base 251 with a raised central portion 251a. Around the periphery of the base 251 are at least two diametrically-opposed cylinders 252 respectively having associated therewith pistons 253. The pistons 253 carry a disk 254 having a central opening 255 therein. Four presser elements 256 are formed on the inner surface of the disk 254 at equidistantly-spaced points therearound and protruding individually therefrom. Each presser element 256 includes a finger 257 directed horizontally inwardly, and a finger 258 on the inner end of the finger 257 directed downwardly. There is also provided an ultrasonic welding horn 259 associated with the fixture 250.

In assembling the valve cartridge 120, three gaskets 151, 152, and 153 are placed respectively in the recesses 125–127 of the support surface 124. As can be seen, the upper ends of the gaskets 150–152 protrude above the support surface 124. The valve seat 160 is then dropped into the chamber 140 of the housing 120a so as to rest on the upper surfaces of the gaskets 150–152 whereby the lower surface 162 of the valve seat 160 is spaced from the support surface 124. The valve plate 170 is then dropped into the chamber 140 of the housing 120a, 122 so that the lower sealing surface 172 thereof rests on the sealing surface 161 of the valve seat 160. Then the bearing plate 180 is dropped into the chamber of the housing 120a, so that the bearing surface 182 rests on the bearing surface 171 of the valve plate 170. As can be seen, the bearing surface 182 is spaced from the shoulder 141 on the housing 120a. The lever arm 210 is assembled on the handle bearing 200 which is, in turn, assembled on the bearing support 190. The combination of these three elements is then dropped into the chamber 140 of the housing 120a such that the lip 194 of the bearing support 190 rests on the shoulder 142 of the housing 120a (see FIG. 10). The slots 199 in the bearing support 190 are respectively aligned with the slots 144 in the housing 120a. It should be noted that the lower surface 192 of the bearing support 190 is spaced from the upper surface 181 of the bearing plate 180 but does rest on the shoulder 142.

The partly-assembled valve cartridge 120 is then placed on the raised central portion 251a of the fixture 250 as indicated and the four presser elements 256 are positioned as shown. Specifically, the finger 258 of each presser element will fit in the space between the bearing support 190 and the handle bearing 200, so that the lower end thereof engages the upper surface 181 of the bearing plate 180. The finger 257 on each of the presser elements 256 is arranged horizontally and disposed in a slot 144 in the housing 120a and in the laterally aligned slots 199 in the bearing support 190. The four cylinders 252 are then actuated to withdraw the pistons 253, thereby pulling down the disc 254, causing the fingers 258 to exert pressure on the bearing plate 180. This pressure is translated by the valve plate 170 and the valve seat 160 to deform the gaskets 151, 152, and 153, until the bearing plate 180 seats on the shoulder 141. Thus, there will be provided a fluid-tight seal between the sealing surfaces 161 and 172 and a predetermined amount of friction therebetween.

While the presser elements 256 are operating on the bearing plate 180, the ultrasonic horn 259 is positioned on the outer surface of the bearing support 190 and transmits ultrasonic energy thereto. The horn 259 vibrates the lip 194 downwardly so that it becomes embedded into the housing 120a to define a "new shoulder" at 142a. The lower surface 192 of the bearing support 190 will then contact the upper surface 181 of the bearing plate 180 to hold the bearing plate 180 in the condition established by the presser elements 256. When the presser elements 256 and the horn 259 are thereafter removed, the relationship between the sealing surfaces 161, 172 and the bearing surfaces 171, 182 is retained by virtue of the ultrasonic weld appearing between the bearing support 190 and the housing 120a. The valve cartridge 120 is now completed and may be used in the faucet 100 depicted in FIGS. 1 to 7. However, it should be understood that the valve cartridge 120 finds use in a number of other installations such as, for example, in a tub and/or a shower.

While there has been described what is at present considered to be the preferred embodiment of the invention, it is to be understood that various changes and modifications may be made therein, without departing from the spirit and scope of the invention, and it is intended that all such changes and modifications be covered as fall within the scope of the appended claims.

What is claimed is:

1. A faucet comprising a faucet base, a hollow casing mounted on said faucet base, a cover for said casing, a spout carried by said casing and having a passageway therethrough communicating with the interior of said casing, and said faucet base having at least one fluid inlet, and a valve cartridge in said casing and including a generally cylindrical housing having a chamber therein, inlet and outlet ports in said housing for said chamber, valve means in said chamber for controlling the quantity of fluid delivered from said inlet port to said outlet port, control means extending from one end of said housing for controlling said valve means, said housing having a valve base portion at the other end thereof, the maximum outer diameter of said valve base portion being no greater than the maximum outer diameter of any other portion of said housing, said valve base portion having a plurality of recesses extending laterally thereinto and defining flange means at the adjacent end of said housing, said flange means having at least one opening extending therethrough, means passing through said opening from said recess for attaching said flange means to said faucet base, said inlet port being in registration with the fluid inlet of said faucet and said outlet port being in communication with the interior of said casing.

2. The faucet set forth in claim 1, wherein said faucet base has a diverter outlet, said valve base having a diverter port therein communicating with said outlet port and with said diverter outlet, whereby fluid delivered to said outlet port can be diverted through said diverter port to said diverter outlet.

3. The faucet set forth in claim 1, wherein said attachment means include a plurality of screws passing through said attachment flange and into said faucet base.

4. The faucet set forth in claim 1, wherein said attachment means includes a plurality of screws passing through said attachment flange and into said faucet base, said screws being inclined to facilitate attachment.

5. The faucet set forth in claim 1, and further comprising gasket means between said faucet base and said valve base to provide a fluid-tight seal between said faucet base and said valve base.

* * * * *